(12) United States Patent
Arnott et al.

(10) Patent No.: US 8,730,805 B2
(45) Date of Patent: May 20, 2014

(54) LOAD ESTIMATION

(75) Inventors: Robert Arnott, Tokyo (JP); Raymond Kwan, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/138,739

(22) PCT Filed: Apr. 26, 2010

(86) PCT No.: PCT/JP2010/057780
§ 371 (c)(1),
(2), (4) Date: Sep. 23, 2011

(87) PCT Pub. No.: WO2010/128668
PCT Pub. Date: Nov. 11, 2010

(65) Prior Publication Data
US 2012/0014251 A1    Jan. 19, 2012

(30) Foreign Application Priority Data

May 8, 2009  (GB) .................................. 0907923.7

(51) Int. Cl.
*H04J 3/14*     (2006.01)
*H04W 72/00*    (2009.01)
(52) U.S. Cl.
USPC ............................ 370/232; 370/343; 455/453
(58) Field of Classification Search
None
See application file for complete search history.

(56) References Cited

U.S. PATENT DOCUMENTS

| 6,393,276 | B1 | 5/2002 | Vanghi |
| 7,120,115 | B1* | 10/2006 | Laaksonen ................... 370/230 |
| 7,194,280 | B2 | 3/2007 | Vanghi |
| 2002/0187801 | A1 | 12/2002 | Vanghi |
| 2007/0155395 | A1 | 7/2007 | Gopalakrishnan et al. |
| 2008/0080378 | A1* | 4/2008 | Kim et al. ...................... 370/234 |
| 2008/0123520 | A1* | 5/2008 | Ji et al. .......................... 370/216 |
| 2008/0188235 | A1 | 8/2008 | Kim et al. |
| 2009/0054072 | A1 | 2/2009 | Chen et al. |
| 2011/0199900 | A1* | 8/2011 | Ludwig et al. ............. 370/230.1 |

FOREIGN PATENT DOCUMENTS

| CN | 101159978 A | 4/2008 |
| WO | WO 01/52425 A2 | 7/2001 |
| WO | WO 2009/024086 A1 | 2/2009 |

OTHER PUBLICATIONS

Chinese Office Action and Search Report dated Oct. 18, 2103.

* cited by examiner

*Primary Examiner* — Kevin C Harper
*Assistant Examiner* — Samina Choudhry
(74) *Attorney, Agent, or Firm* — McGinn IP Law Group, PLLC

(57) ABSTRACT

An OFDM based communications system is provided, in which a scheduler is configured to estimate the load of existing bearers and the load increase that will arise from a new requested bearer if that bearer is accepted. Several techniques are described for estimating these loads and their advantages and disadvantages are also discussed. Estimators are also provided that can estimate the loads from a previous estimate and current load conditions.

8 Claims, 3 Drawing Sheets

LOAD ESTIMATION

TECHNICAL FIELD

The present invention relates to load estimation performed by communications devices, particularly but not exclusively devices operating using OFDMA communications techniques. The invention has particular but not exclusive relevance to load estimation in communications devices defined according to the 3GPP (3rd Generation Partnership Project) standards for use in admission control, congestion control and load balancing (between cells).

BACKGROUND ART

Load estimation is the problem of estimating what fraction of the cell's available physical radio resources each user needs in order to meet its required Quality of Service (QoS). This may be different from the amount of resources it is currently consuming. Load estimation is a prerequisite for many radio resource management functions, including call admission control, congestion control and load balancing (between cells). For example, when deciding on whether or not to admit a new bearer in a cell, the base station (or eNB (evolved NodeB) using LTE (Long Term Evolution) terminology) will estimate the current load of the cell and the load increase caused by the new bearer and will then make a decision of whether or not to admit the new bearer depending on available system resources. The task of estimating the current load and the load increase is not trivial and depends upon, among other things, the number of existing radio bearers and their class of service (guaranteed bit rates etc), the type of new bearer requested and channel conditions between the base station and the respective User Equipment (UE).

Similar requirements were defined for admission control in WCDMA (Wideband Code Division Multiple Access) communications systems. However, one of the difficulties in admission control for WCDMA is that the resource is interference based, meaning that the interference due to the introduction of a new bearer can potentially affect the quality of other bearers. As a result the power levels of other bearers may have to go up, causing further interference in a further set of bearers etc. Thus estimating the effect of a new bearer is an iterative process that continues until either the interference level converges (ie the desired qualities of all bearers are reached) or one or more bearers are dropped. The techniques used in WCDMA systems are not generally applicable to OFDMA systems.

US-A-2008/0080378 describes a technique that can be used to estimate the load in an OFDMA system for the purposes of admission control. The system maintains, for each class of service, an average block requirement for that class. When a new bearer is requested, the system determines the class of the requested bearer and then determines the number of required resource blocks from the stored data and then determines whether or not to admit the new bearer depending on whether or not the required number of resource blocks is less than the available number of resource blocks.

DISCLOSURE OF INVENTION

The present invention provides alternative techniques for estimating load—either existing load or load increase due to a requested new bearer or both.

One aspect of the present invention provides a communications apparatus comprising: a transceiver circuit operable to communicate with a plurality of communications devices over a radio communications link using a plurality of resource blocks; a scheduler operable to allocate resource blocks to radio bearers, each radio bearer being associated with a communications device, for communicating data between the transceiver circuit and the associated communications device; and a load estimator operable to estimate, for at least one bearer, the resource blocks required to meet a defined quality of service associated with the bearer; wherein the scheduler is operable to provide the load estimator with measurement data for the at least one bearer that varies with the radio conditions between the transceiver circuit and the associated communications device for use in estimating the load for the at least one bearer.

The load estimator may estimate, for the at least one bearer, the resource blocks required to meet the defined quality of service in dependence upon the measurement data received from the scheduler and a required data rate for the bearer and/or in dependence upon a spectral efficiency for the associated communications device.

The measurement data for the at least one bearer may comprise a measure of the bit rate that the bearer can achieve in each of the scheduled resource blocks.

The load estimator may estimate the load ($\rho$) for the at least one bearer using the following equation:

$$\rho = \bar{a}\frac{1}{K}\frac{R^{req}}{\bar{\omega}}$$

where:

$\bar{a}$ represents the activity of the bearer;

K is the total number of available resource blocks;

$R^{req}$ is a required bit rate for the bearer;

$\bar{\omega}$ is the spectral efficiency for the associated communications device. This may be, for example, a time average value or percentile value.

The load estimator can determine the spectral efficiency for the associated communications device using the following term:

$$\omega = \frac{1}{K}\sum_{k=1}^{K} r_k$$

where $r_k$ is the instantaneous bit rate that the bearer could achieve in resource block number k.

Alternatively, the load estimator may determine the spectral efficiency for the associated communications device from the following term:

$$\omega = \frac{1}{|S|}\sum_{k \in S} r_k$$

where $r_k$ is the instantaneous bit rate that the bearer could achieve in resource block number k and S is the smallest set of resource blocks that would be sufficient to meet the instantaneous bit rate requirement.

Alternatively the load estimator can determine the spectral efficiency for the associated communications device from the following term:

$$\omega = \frac{1}{N} \sum_{k \in A} r_k$$

where $r_k$ is the instantaneous bit rate that the bearer could achieve in resource block number k; A is the set of resource blocks assigned to the bearer by the scheduler; and N is the number of resource blocks in set A.

The load estimator may estimate the load ($\rho$) for the at least one bearer using the following equation:

$$\rho = \frac{R^{req}}{T} \frac{\overline{N}}{K}$$

where:

T represents a throughput provided to the bearer during periods of activity

K is the total number of available resource blocks;

$R^{req}$ is a required bit rate for the bearer; and $\overline{N}$ is a representative number (for example the time average number) of resource blocks that the scheduler assigns to the bearer.

The load estimator can determine the throughput provided to the bearer from the following term:

$$T = \sum_{k \in A} r_k$$

where $r_k$ is the instantaneous bit rate that the bearer could achieve in resource block number k and A is the set of resource blocks assigned to the bearer by the scheduler.

The load estimator can estimate the required bit rate for the bearer in dependence upon a delay constraint defined for the bearer, for example using the following equation:

$$\frac{S(t)}{(t^{(arr)} + t_m^{(DB)} - t)}$$

where:

S (t) is the size (in bits) of the oldest packet in a buffer of the bearer at time t;

$t^{(arr)}$ is the time at which this oldest packet arrived in the buffer; and $t_m^{(DB)}$ is the delay constraint defined for the bearer.

The communications apparatus may receive a request to establish a new bearer and the load estimator may estimate a load for the new bearer. In this case, the communications apparatus preferably further comprising an admission controller for determining whether or not to admit the new bearer in dependence upon the estimated load for the new bearer and the estimated load for existing bearers.

If the new bearer is associated with a communications device for which there already exists a bearer, the load estimator can estimate the load for the new bearer in dependence upon the measurements provided by the Scheduler for the existing bearer associated with the same communications device. For example, the load estimator can estimate the load for the new bearer in dependence upon channel conditions between the communications apparatus and the associated communications device.

The load estimator can estimate the load ($\Delta\rho$) for the new bearer using the following equation:

$$\Delta\rho = \frac{R^{req}}{K} \left( \frac{\overline{a}}{\overline{\omega}} \right)$$

where:

$\overline{a}$ is an activity factor for the bearer;

K is the total number of available resource blocks;

$R^{req}$ is a required bit rate for the bearer;

$\overline{\omega}$ is a spectral efficiency for the associated communications device.

The spectral efficiency for the associated communications device may be determined from one or more other bearers associated with the same communications device.

Alternatively the load estimator can estimate the load ($\Delta\rho$) for the new bearer using the following equation:

$$\Delta\rho = \frac{R^{req}}{K} \left( \frac{\overline{N}}{T} \right)$$

where:

T represents a throughput that may be determined, for example, from the throughput that the scheduler provides to similar bearers;

K is the total number of available resource blocks;

$R^{req}$ is a required bit rate for the bearer; and $\overline{N}$ is a representative number of resource blocks that the scheduler assigns to similar bearers.

In one embodiment, the scheduler provides measurement data identifying the number of resource blocks assigned to the at least one bearer at each time point and the load estimator maintains, for the at least one bearer, a running average of the number of resource blocks assigned to the respective bearers and uses the running average for the bearer when estimating the load for the bearer.

The present invention also provides a communications system comprising the above communications apparatus and one or more communications devices (for example mobile telephones) operable to establish bearers with the communications apparatus for communicating data between the communications device and the communications apparatus.

The present invention also provides a communications method comprising: using a transceiver circuit to communicate with a plurality of communications devices over a radio communications link using a plurality of time and frequency resource blocks; allocating resource blocks to radio bearers, each radio bearer being associated with a communications device, for communicating data between the transceiver circuit and the associated communications device; and estimating, for the at least one bearer, the resource blocks required to meet a defined quality of service associated with the bearer; providing measurement data for the at least one bearer that varies with the radio conditions between the transceiver circuit and the associated communications device, and wherein the estimating estimates, for the at least one bearer, the resource blocks required to meet the defined quality of service in dependence upon the provided measurement data.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

An exemplary embodiment of the invention will now be described, by way of example, with reference to the accompanying drawings in which.

BEST MODE FOR CARRYING OUT THE INVENTION

Overview

Figure 1:
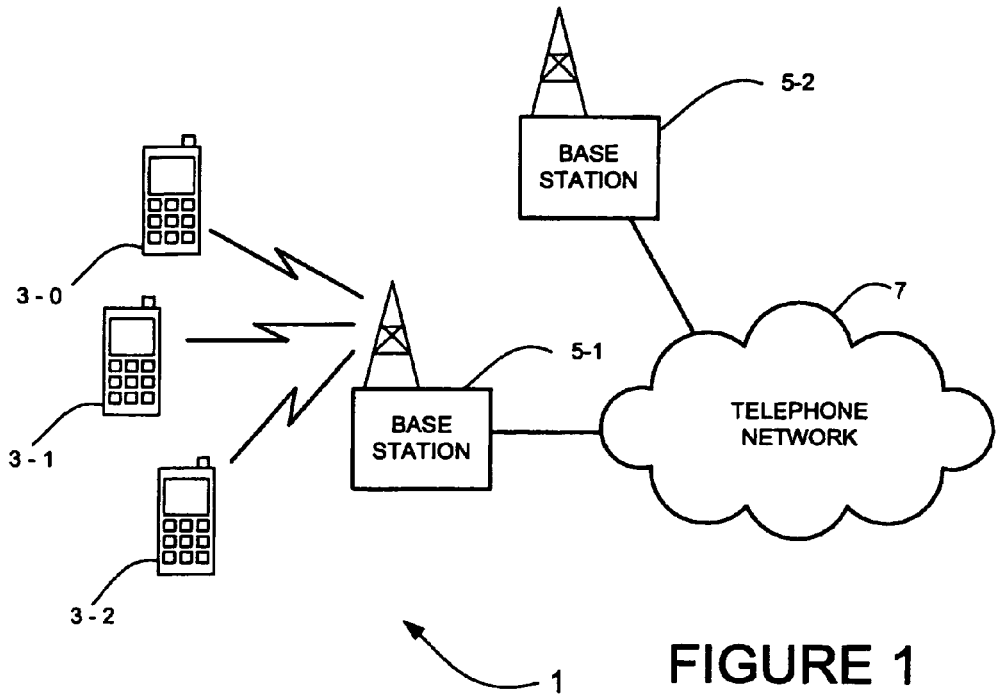
FIG. 1 schematically illustrates a mobile telecommunication system of a type to which the invention is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. A number of uplink and downlink communications resources (sub-carriers, time slots etc) are available for the wireless link between the mobile telephones 3 and the base stations 5. In this exemplary embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5.

The base station generally provides services to the mobile telephones by establishing a radio bearer for each service that is requested. For example, one radio bearer may be defined for carrying video data, one may be defined for carrying audio data, one may be defined for carrying bursty web traffic etc. Various types of radio bearers are defined, depending on the quality of service associated with the type of data to be carried by the radio bearer. For example, a radio bearer used for video or audio traffic may be provided in a higher class than radio bearers used for internet traffic—as users can tolerate delays with internet traffic but cannot tolerate delays in the delivery of video data. At the time of establishing a new connection, radio bearers are established that will provide the required service with the desired quality of service. When a new connection is to be established, the base station 5 must make sure that it has the resources to be able to provide the desired service and must be able to provide the service without affecting the service of existing connections. To be able to achieve this, the base station 5 must estimate the existing load on the base station 5 and the expected load caused by the new connection.

LTE Sub Frame Data Structure

Before discussing the specific ways in which the base station 5 can determine load estimates, a description will be given of the access scheme and a general frame structure agreed for LTE Rel 8. An Orthogonal Frequency Division Multiple Access (OFDMA) technique is used for the downlink to allow the mobile telephones 3 to receive data over the air interface with the base station 5. Different sub-carriers are allocated by the base station 5 (for a predetermined amount of time) to each mobile telephone 3 depending on the amount of data to be sent to the mobile telephone 3. These sub-carriers and temporal allocations are defined as physical resource blocks (PRBs) in the LTE specifications. PRBs thus have a time and frequency dimension. The base station 5 dynamically allocates PRBs for each device that it is serving and signals the allocations for each sub-frame (TTI) to each of the scheduled mobile telephones 3 in a control channel.

Figure 2A:
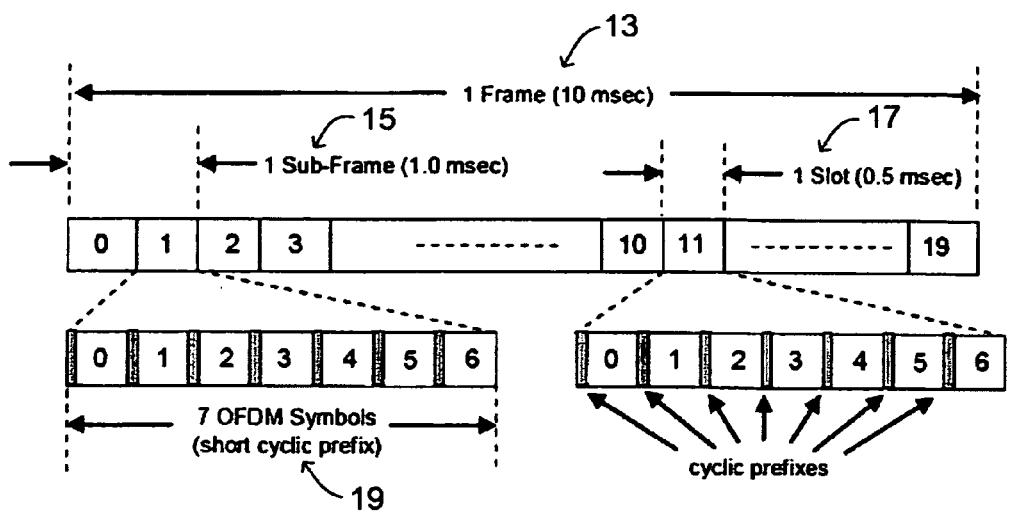
FIG. 2a schematically illustrates a generic frame structure used in communications over the wireless links of the system shown in FIG. 1.
Figure 2B:
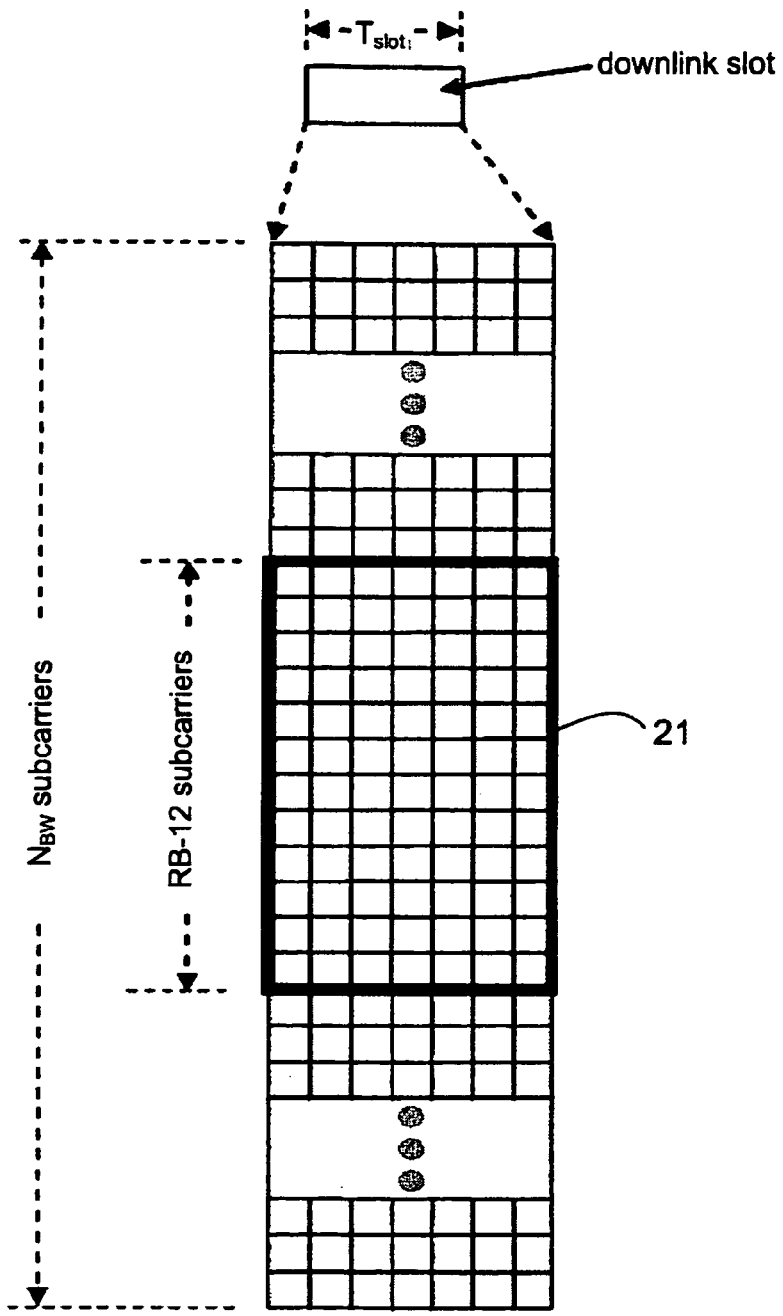
FIG. 2b schematically illustrates the way in which the frequency subcarriers are divided into resource blocks and the way that a time slot is divided into a number of OFDM symbols.

FIG. 2a illustrates a generic frame structure agreed for LTE Rel 8 communications over the air interface with the base station 5. As shown, one frame 13 is 10 msec long and comprises ten sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17. A PRB over two slots is also defined by the LTE specifications as being the smallest element of resource alloCation assigned by the base station scheduler. These sub-carriers are then modulated onto a component carrier to up-convert the signal to the desired transmission bandwidth. The transmitted downlink signal thus comprises $N_{BW}$ subcarriers for a duration of $N_{symb}$ OFDM symbols. It can be represented by a resource grid as illustrated in FIG. 2b. Each box in the grid represents a single sub-carrier for one symbol period and is referred to as a resource element. As shown, each PRB 21 is formed from 12 consecutive sub-carriers and (in this case) seven symbols for each subcarrier; although in practice the same allocations are made in the second slot 17 of each sub-frame 15 as well.

At the start of each sub-frame 15, the base station 5 transmits a PDCCH (Physical Downlink Control CHannel) over the first three symbols. The remaining symbols form the PDSCH (Physical Downlink Shared CHannel) which is used to carry the downlink user data for the mobile telephones 3. The PDCCH channel includes, among other things, data for each of the mobile telephones 3, indicating if the mobile telephone 3 is scheduled for receiving downlink data in that sub-frame or is scheduled for uplink transmission in that sub-frame; and if so, data identifying the PRBs to be used for receiving the downlink data or for transmitting the uplink data.

Base Station

Figure 3:
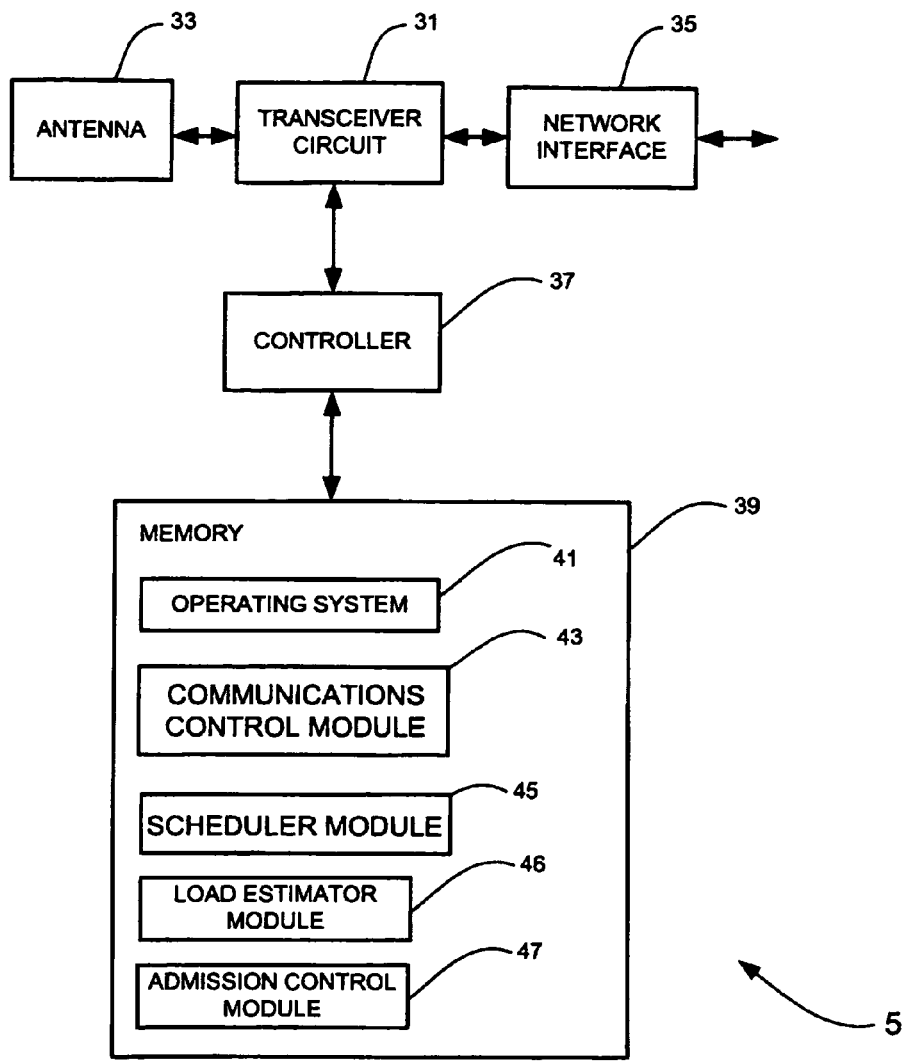
FIG. 3 schematically illustrates abase station forming part of the system shown in FIG. 1.

FIG. 3 is a block diagram illustrating the main components of each of the base stations 5 shown in FIG. 1. As shown, each base station 5 includes transceiver circuitry 31 which is operable to transmit signals to and to receive signals from the mobile telephones 3 via one or more antennae 33 and which is operable to transmit signals to and to receive signals from the telephone network 7 via a network interface 35. A controller 37 controls the operation of the transceiver circuitry 31 in accordance with software stored in memory 39. The software includes, among other things, an operating system 41 and a communications control module 43, a scheduler module 45, a load estimator module 46 and an admission control module 47. The operating system 41 is operable to control the generation of the sub-frames in the different sub-bands in which the uplink and downlink data is transmitted from/to the mobile telephones 3. The scheduler module 45 is operable to schedule the times for the transmission of the downlink data to the mobile telephones 3 and the times for the mobile telephones 3 to transmit their uplink data to the base station 5. The load estimator module 46 is responsible for determining load estimates for existing radio bearers and newly requested radio bearers and for reporting these load estimates to the admission control module 47. The admission control module 47 is responsible for using the load estimates determined by the load estimator module 46 to determine whether or not to admit a requested new radio bearer; for congestion control; or for load balancing mobile telephones 3 between cells.

In the above description, the base station 5 is described for ease of understanding as having a number of discrete modules (such as the scheduler module, the load estimator module, the admission control module etc). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Existing Load Estimation

In the 3GPP standards defined for LTE, physical radio resources are most conveniently measured in terms of Physical Resource Blocks (PRBs), although the methods described below are equally applicable to any other OFDM-based system. The methods are applicable to both uplink and downlink.

The following description is with respect to a single user (or more properly, a single bearer, since a user could have more than one bearer and a load estimate may be required for each one). The term TTI is used as a time unit. In LTE this corresponds to one sub-frame.

An over-bar is generally used to denote a time-averaged quantity, eg. $\bar{x}$ is the time average of the quantity x. The duration of the averaging should be understood to be typically a few hundred to a few thousand TTIs—long enough to average out the effects of short term variations in radio channel quality (fading) but short enough to respond to changes in average radio channel conditions. The appropriate averaging period may be different for different quantities. Any time averaging method could be used, but in practice. $\bar{x}$ is preferably estimated using the exponential weighted average ('forgetting factor') method, in which the estimate is updated at each time instant t according to: $\bar{x}(t)=\beta\bar{x}(t-1)+(1-\beta)x(t)$, where $\beta$ is a constant slightly less than 1. (A lower value of $\beta$ could be used for the first few samples to speed convergence).

The following description of exemplary embodiments will make reference to the following definitions:

- K The total number of PRBs in the system bandwidth (or alternatively, the total number of PRBs available for user data, ie. excluding those assigned for control channels etc).
- $\rho$ The estimated load of the bearer, ie. the physical radio resources it requires to meet its QoS requirements. This is expressed as a fraction of the total cell resources, but it could instead be expressed as a number of PRBs, by simply multiplying by K.
- a This value is 1 if the bearer is active in a given TTI, otherwise it is 0. A bearer is active if there is data in its queue waiting to be sent (ie. if it is requesting radio resources from the scheduler). The time averaged value $\bar{a}$ is therefore the mean activity of the bearer, ie. the fraction of time for which it is requesting resources from the scheduler.
- $R^{req}$ The required bit rate for the bearer, ie. the rate that it needs in order to meet its QoS requirement. (In the following, all bit rates are expressed as bits per TTI, but could of course instead be expressed as bits/second). For a Guaranteed Bit Rate (GBR) service, $R^{req}$ is just the GBR. For a service with specific constraints on packet transmission delay, $R^{req}$ represents the bit rate which is sufficient to meet the packet delay requirements. In this case $R^{req}$ could either be estimated in real time from actual packets, or configured in advance based on a priori knowledge of the typical packet statistics for the service in question. For a best-effort service which has no specific bit-rate or delay requirements, $R^{req}$ could be a value configured by the operator to guarantee a certain minimum QoS for that type of service (which effectively transforms the best-effort service into a GBR service).
- $r_k$ The instantaneous bit rate that this bearer could achieve in PRB number k, ie. the number of bits that this user could transmit in PRB number k if that PRB were allocated to the user in the current TTI. This depends on the instantaneous radio channel quality, which is assumed to be known by the base station 5 from channel measurements received from the mobile telephones 3.
- N The number of PRBs which the scheduler module 45 actually assigns to this bearer in a given TTI (including PRBs allocated for HARQ (Hybrid Automatic Repeat Request) retransmissions).
- $\bar{N}$ The time average of N over all TTIs, including those in which the bearer is not scheduled (ie. those in which N is zero)

Three methods for estimating the load of a single bearer will now be described.

Method A

In this method, the load estimate is based on the actual PRB usage of the bearer, ie.

$$\rho = \frac{\bar{N}}{K}$$

Thus, to implement this method, the scheduler module 45 would inform the load estimator module 46 of the number of PRBs allocated to each bearer during each TTI and the load estimator 46 would maintain, for each bearer, a running average of the number of PRBs that are assigned to that bearer in each TTI, and would then divide this number by K, to yield the estimated load for the bearer. This method has the advantage of simplicity. It is adequate provided that the bearer is generating data in a fairly steady fashion at a rate close to its required rate $R^{req}$, and this condition is usually met for streaming-type services (such as video or audio streaming). However in the case of best-effort services, if the bearer has a lot of data to send and there are spare radio resources in the cell then the scheduler may assign the bearer many more PRBs than it actually needs to meet its QoS requirement. In this case, the estimate produced by this method is not a good indication of the actual resources needed by the bearer. This problem is addressed by the following alternative methods.

Method B

In this method, the load is estimated by predicting the required number of PRBs from the user's average radio channel conditions, as follows $$\rho = \bar{a}\frac{1}{K}\frac{R^{req}}{\bar{\omega}}$$

Here $\bar{\omega}$ denotes the user's Average Spectral Efficiency (ASE), which is an estimate of how many bits it can transmit per PRB per TTI. $\bar{\omega}$ is the time-average of the quantity $\omega$, which is computed using one of the following three alternative methods:

Method B1

In Method B1, ω is simply the average of $r_k$ over all PRBs in the system bandwidth:

$$\omega = \frac{1}{K}\sum_{k=1}^{K} r_k$$

With this method, the load measurement for each user depends only on the user's channel quality (ie the quality of the channel between the user's mobile telephone 3 and the base station 5), and not on other users in the cell. This method also allows ω to be updated in every sub-frame, regardless of whether the user is scheduled in that sub-frame or not, and regardless of whether it has data to send or not. This means that the load estimate ρ depends only on the user's required rate $R^{(req)}$ and mean channel conditions, and does not depend on the user's traffic activity or scheduling decisions. The main problem with this method, however, is that it will tend to overestimate the resources required by the bearer, because it is based on an average channel quality over all PRBs, whereas a mobile telephone 3 will usually be scheduled only in its best PRBs.

Method B2

In Method B2, ω is the average of $r_k$ over a set of PRBs S, where S is the smallest set of PRBs that would be sufficient to meet the instantaneous bit rate requirement (ie. the smallest set for which the condition $$\sum_{k \in S} r_k \geq R^{req}$$

holds):

$$\omega = \frac{1}{|S|}\sum_{k \in S} r_k$$

Since Method B2 averages $r_k$ over the user's best PRBs, it will tend to produce a higher value of ω (and hence a lower value of ρ) than Method B1. Furthermore, since the scheduler module 45 will generally tend to schedule each user in its best PRBs, Method B2 should give a more accurate prediction than Method B1 of the number of PRBs that the scheduler module 45 needs to assign to the bearer to achieve the required rate $R^{req}$. However Method B2 also has higher computational cost, since it requires the load estimator module 46 to sort all of the PRBs based on $r_k$ so that it can work out the smallest set that will meet the above condition.

Method B3

In Method B3, ω is calculated using only the PRBs in which the user is actually scheduled:

$$\omega = \frac{1}{N}\sum_{k \in A} r_k$$

where A is the set of assigned PRBs.

In this method, the load for each mobile telephone 3 may depend on the number of mobile telephones 3 in the cell (as this will define when the bearer is scheduled). Note that in Method B3, $\overline{\omega}$ is found by averaging ω only over those TTIs in which the bearer is scheduled (including HARQ retransmissions), which raises problems of how to update the load measurement during periods of data inactivity. In both Method B1 and Method B2, however, ω is calculated every TTI, regardless of whether the bearer is scheduled or not, and ω is found by averaging over all TTIs.

Of the three methods for calculating ω, Method B3 gives the most accurate estimate, since it is based on the resource assignment actually made by the scheduler module 45. It also has low computation complexity, because the calculation of ω only needs to be performed for scheduled bearers (which are usually a small sub-set of the total number of bearers in any given cell). However a disadvantage of Method B3 is that it is not possible to update the load estimate during periods in which the bearer is not being scheduled because it is inactive (ie. has no data waiting to be sent). This could cause the load estimate to become inaccurate due to changing average radio conditions if the period of inactivity is long.

Method C

In this method, the load is estimated based on the bearer's actual PRB usage and throughput, as follows $$\rho = \frac{R^{req}}{T}\frac{\overline{N}}{K}$$

Here T represents the average throughput provided to the bearer during periods of activity. More specifically, it is the average number of bits sent by the bearer over all TTIs in which a=1, not including bits sent for HARQ retransmissions.

In TTIs in which the bearer is scheduled, one way to calculate T is to sum $r_k$ over all scheduled PRBs:

$$T = \sum_{k \in A} r_k$$

Clearly this is identical to the calculation of ω in Method B3, except for a factor of N. However, whereas $\overline{\omega}$ is obtained by averaging only over TTIs in which the bearer is scheduled, T is obtained by averaging over all TTIs in which the bearer is active. (In TTIs where the bearer is active but not scheduled, or is scheduled for HARQ retransmission, T=0).

Furthermore, although T can be calculated from $r_k$ using the method above, in practice it is simpler and more accurate to use the actual number of bits that are transmitted by the bearer in the scheduled TTI, based on the transport format selected by the scheduler.

Note that the activity term $\overline{a}$ is not required in Method C because the activity is taken into account in the average PRB usage $\overline{N}$.

Method C has essentially the same advantages and disadvantages as Method B3. Although Method C can be updated even when the bearer is not active, if the radio conditions change during a period in which the bearer is not being scheduled then this will not be reflected in the load.

Computation of $R^{req}$

In both methods B and C discussed above, the load estimator module 46 used a value for the required bit ($R^{req}$) for the bearer when determining the load for the bearer. For Guaranteed Bit Rate (GBR) bearers, $R^{req}$ can be set simply to the bearer's required GBR, ie $$R^{req} = GBR$$

For bearers with a delay constraint, there are two options. The simplest approach is to set $R^{req}$ to a fixed bit rate which should be sufficient to meet the delay budget requirement. This can be pre-computed for each QoS Class Indicator (QCI) class (or service), and stored in a look-up-table. This rate can be referred to as an equivalent GBR.

A more sophisticated approach is to try to estimate directly what bit rate is required to meet the delay budget. For a QCI class m that has a delay budget, the following is an estimate of the bit rate needed to meet the delay budget requirement for a bearer:

$$T^{req}(t) = \frac{S(t)}{(t^{(arr)} + t_m^{(DB)} - t)}$$

Where:
S (t) is the size (in bits) of the oldest packet in the RLC (Radio Link Control) buffer of the bearer at time t
$t^{(arr)}$ is the time at which this (oldest) packet arrived (ie. when it became visible to the MAC (Media Access Control) scheduler)
$t_m^{(DB)}$ is the (MAC scheduler's) delay budget for QCI class m Then the load estimator module 46 can set:

$$R^{req} = \overline{T^{req}}$$

where $\overline{T^{req}}$ is a time average of $T^{req}(t)$, the averaging being performed over all TTIs in which the bearer has data to be transmitted.

If the bearer has both a GBR and a delay budget constraint, then the load estimator module 46 can set:

$$R^{req} = \max(GBR, \overline{T^{req}})$$

In some situations, the precise arrival time of a packet into the RLC buffer may not be easily estimated. For example, in the case of the uplink, upon the arrival of a new packet at the mobile telephone RLC buffer, no information can be signalled from the mobile telephone 3 allowing the base station 5 to estimate the packet arrival time precisely. However, if the average packet size $\overline{S}$ and the packet arrival rate $\lambda$ of the bearer are known, then the load estimator module 46 can approximate the required bit rate (or the equivalent-GBR) as:

$$R^{req} = \begin{cases} \max(GBR, \lambda \overline{S}), & \text{for GBR Bearers} \\ \lambda \overline{S}, & \text{for non-GBR Bearers} \end{cases}$$

Admission Control

For admission control (and other functions) it is necessary to calculate the overall load of the cell. This can be done by first calculating the load of each bearer using one of the methods described above, and then summing the load contributions of all bearers.

It may also be necessary to provide a load estimate for each class of bearer (ie. type of service). This can be done by summing the load contributions of all bearers belonging to a given bearer class. Alternatively, the methods above could be applied to bearer classes instead of to individual bearers. For example, in the case of Method B, the quantities $\overline{a}$ and $\overline{\omega}$ could be calculated over all bearers belonging to the class, and then used to calculate a single load value for that class.

Load Increase Estimation

The preceding section described how the load estimator module 46 measured the load contribution of existing bearers. This section describes how the load estimator module 46 can estimate the load contribution of new bearers before they are admitted. This estimate can be used by the admission control module 47 to decide whether or not the new bearer should be admitted.

Following the formulation of Method B above, the load increase caused by adding a new bearer can be estimated as follows:

$$\Delta \rho = \frac{R^{req}}{K} \left( \frac{\overline{a}}{\overline{\omega}} \right)$$

Here $R^{req}$ represents the bit rate being requested by the new bearer. To calculate $\overline{\omega}$, there are several options and scenarios to be considered.

In the case that the new bearer belongs to a mobile telephone 3 which already has one or more active bearers (or is actually a modification of the bit rate of an existing bearer), then a measurement of $\overline{\omega}$ may already be available for that mobile telephone 3 (using any of the methods B1-B3 above), in which case this measurement can be applied directly.

Furthermore, in the above case, instead of using the mean value of the estimated $\omega$ for $\overline{\omega}$ the load estimator module 46 could instead use any point on its estimated probability distribution. For example, by using the 5 per-centile point (ie. the value that $\omega$ exceeds for 95% of the time) instead of the mean, a higher value of $\Delta p$ will be produced, resulting in a more conservative admission control policy. Alternatively, instead of using a fixed per-centile point, a value equal to the estimated mean plus or minus some multiple of the estimated standard deviation could be used.

In the case that the load estimator module 46 does not have any measurement of $\overline{\omega}$ available for the mobile telephone 3 requesting the new bearer, the load estimator module 46 may:

Use the average value of $\overline{\omega}$ over all existing mobile telephones 3 in the cell; or Use a fixed value (possibly dependent on service type or QoS class) configured by the operator.

The activity factor $\overline{a}$ is bearer specific and is likely to depend on the type of service. As such, even if the requesting mobile telephone 3 already has existing bearers, it may not be appropriate to use activity measurements of those bearers for admission control because different bearers belonging to the same mobile telephone 3 are likely to relate to different services. Instead the load estimator module 46 may:

Use the average value of $\overline{a}$ over all existing bearers in the cell which are 'similar' to (i.e. of the same service type, or QoS class, etc.) the requesting bearer; or Use a fixed value (possibly dependent on service type or QoS class) configured by the operator.

Alternatively, following the formulation of Method C above, the load increase caused by adding a new bearer can be estimated as follows $$\Delta \rho = \frac{R^{req}}{K} \left( \frac{\overline{N}}{\overline{T}} \right)$$

Note that the term $$\left(\frac{N}{T}\right)$$

is equivalent to $$\left(\frac{a}{\omega}\right)$$

in the Method B formulation above, and as such includes both the activity (which is bearer type specific) and the average spectral efficiency (ASE, which is mobile telephone specific). To obtain a value for $$\left(\frac{N}{T}\right)$$

the load estimator module 46 may:

Use the average value of $$\left(\frac{N}{T}\right)$$

over all existing bearers in the cell; or
Use the average value of $$\left(\frac{N}{T}\right)$$

over all existing bearers in the cell which are 'similar' to (i.e. of the same service type, or QoS class, etc.) the requesting bearer; or Use a fixed value (possibly dependent on service type or QoS class) configured by the operator.

Modifications and Alternatives

A number of detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

In the above exemplary embodiment, a mobile telephone based telecommunications system was described. As those skilled in the art will appreciate, the load estimation techniques described in the present application can be employed in any OFDMA communications system. In the general case, the base stations and the mobile telephones can be considered as communications nodes or devices which communicate with each other. Other communications nodes or devices may include access points and user devices such as, for example, personal digital assistants, laptop computers, web browsers, etc.

In the above exemplary embodiments, a number of software modules were described. As those skilled will appreciate, the software modules may be provided in compiled or un-compiled form and may be supplied to the base station as a signal over a computer network, or on a recording medium. Further, the functionality performed by part or all of this software may be performed using one or more dedicated hardware circuits. However, the use of software modules is preferred as it facilitates the updating of the base station 5 in order to update its functionality. Similarly, although the above exemplary embodiments employed transceiver circuitry, at least some of the functionality of the transceiver circuitry can be performed by software.

In the above exemplary embodiments, a number of different techniques were described for calculating load and load increase estimations. The load estimator may be configured to use any of the techniques described above and may select the method to be used in dependence upon the information/measurements provided by the scheduler (which may be vendor specific).

In the above exemplary embodiments, the load estimator used a number of time averages when calculating estimated loads for bearers. As those skilled in the art will appreciate, it is not essential to use such time average values. Other representative values may be used.

In the above exemplary embodiments, the base station performed the load estimation. In other exemplary embodiments, other communications nodes may perform the load estimation and possibly also the admission control. Such other communications node may form part of the core network or may be located in a gateway device between the base station and the core network. In such an exemplary embodiment, the base station scheduler would supply the required measurements to the load estimating device so that it can determine the load estimations.

Various other modifications will be apparent to those skilled in the art and will not be described in further detail here.

This application is based upon and claims the benefit of priority from United Kingdom patent application No. 0907923.7, filed on May 8, 2009, the disclosure of which is incorporated herein in its entirety by reference.

The invention claimed is:

1. A communications apparatus comprising:
a transceiver circuit operable to communicate with a plurality of communications devices over a radio communications link using a plurality of time and frequency resource blocks;
a scheduler operable to allocate the resource blocks to radio bearers, each radio bearer being associated with a communications device, for communicating data between the transceiver circuit and the associated communications device; and
a load estimator operable to estimate, for at least one bearer, the resource blocks required to meet a defined quality of service associated with the bearer;
wherein the scheduler is operable to provide the load estimator with measurement data for the at least one bearer that varies with radio conditions between the transceiver circuit and the associated communications device, and wherein the load estimator is operable to estimate, for the at least one bearer, the resource blocks required to meet the defined quality of service in dependence upon the measurement data received from the scheduler; wherein the load estimator is operable to estimate, for the at least one bearer, the resource blocks required to meet the defined quality of service in dependence upon a spectral efficiency for the associated communications device, and wherein the load estimator is operable to estimate the load ($\rho$) for the at least one bearer using the following equation:

$$\rho = \bar{a}\frac{1}{K}\frac{R^{req}}{\bar{\omega}}$$

where:
$\bar{a}$ is an activity factor for the bearer;
K is the total number of available resource blocks;
$R^{req}$ is a required bit rate for the bearer;
$\bar{\omega}$ is the spectral efficiency for the associated communications device.

2. A communications apparatus according to claim 1, wherein the load estimator is operable to determine the spectral efficiency for the associated communications device using the following term:

$$\omega = \frac{1}{K}\sum_{k=1}^{K} r_k$$

where $\omega$ is the spectral efficiency, $r_k$ is the instantaneous bit rate that the bearer could achieve in resource block number k.

3. A communications apparatus according to claim 1, wherein the load estimator is operable to determine the spectral efficiency for the associated communications device using the following term:

$$\omega = \frac{1}{|S|}\sum_{k \in S} r_k$$

where $\omega$ is the spectral efficiency, $r_k$ is the instantaneous bit rate that the bearer could achieve in resource block number k and S is the smallest set of resource blocks that would be sufficient to meet the instantaneous bit rate requirement.

4. A communications apparatus according to claim 1, wherein the load estimator is operable to determine the spectral efficiency for the associated communications device using the following term:

$$\omega = \frac{1}{N}\sum_{k \in A} r_k$$

where $\omega$ is the spectral efficiency, $r_k$ is the instantaneous bit rate that the bearer could achieve in resource block number k; A is the set of resource blocks assigned to the bearer by the scheduler; and N is the number of resource blocks in set A.

5. A communications apparatus according to claim 1, wherein the load estimator is operable to estimate the required bit rate for the bearer in dependence upon a delay constraint defined for the bearer.

6. A communications apparatus according to claim 5, wherein the load estimator is operable to estimate the required bit rate for the bearer using the following equation:

$$\frac{S(t)}{(t^{(arr)} + t_m^{(DB)} - t)}$$

where:
S(t) is the size (in bits) of the oldest packet in a buffer of the bearer at time t;
$t^{(arr)}$ is the time at which this oldest packet arrived in the buffer; and
$t_m^{(DB)}$ is the delay constraint defined for the bearer.

7. A communications apparatus comprising:
a transceiver circuit operable to communicate with a plurality of communications devices over a radio communications link using a plurality of time and frequency resource blocks;
a scheduler operable to allocate the resource blocks to radio bearers, each radio bearer being associated with a communications device, for communicating data between the transceiver circuit and the associated communications device; and
a load estimator operable to estimate, for at least one bearer, the resource blocks required to meet a defined quality of service associated with the bearer,
wherein the scheduler is operable to provide the load estimator with measurement data for the at least one bearer that varies with radio conditions between the transceiver circuit and the associated communications device, and wherein the load estimator is operable to estimate, for the at least one bearer, the resource blocks required to meet the defined quality of service in dependence upon the measurement data received from the scheduler,
wherein the communication apparatus is operable to receive a request for establishing a new bearer,
wherein the load estimator is operable to estimate a load for the new bearer,
wherein if the new bearer is associated with a communications device for which there already exists a bearer, said load estimator is operable to estimate the load for the new bearer in dependence upon the measurements provided by the scheduler for the existing bearer associated with the same communications device, and
wherein the load estimator is operable to estimate the load for the new bearer in dependence upon channel conditions between the communications apparatus and the associated communications device, and
wherein the load estimator is operable to estimate the load ($\Delta\rho$) for the new bearer using the following equation:

$$\Delta\rho = \frac{R^{req}}{K}\left(\frac{\bar{a}}{\bar{\omega}}\right)$$

where:
$\bar{a}$ is an activity factor for the bearer;
K is the total number of available resource blocks;
$R^{req}$ is a required bit rate for the bearer;
$\bar{\omega}$ is a spectral efficiency for the associated communications device.

8. A communications apparatus according to claim 7, wherein the spectral efficiency for the associated communications device is determined from one or more other bearers associated with the same communications device.

* * * * *